Dec. 12, 1944.   F. C. REGGIO   2,364,817
REGULATING DEVICE
Filed Jan. 27, 1941   4 Sheets-Sheet 3
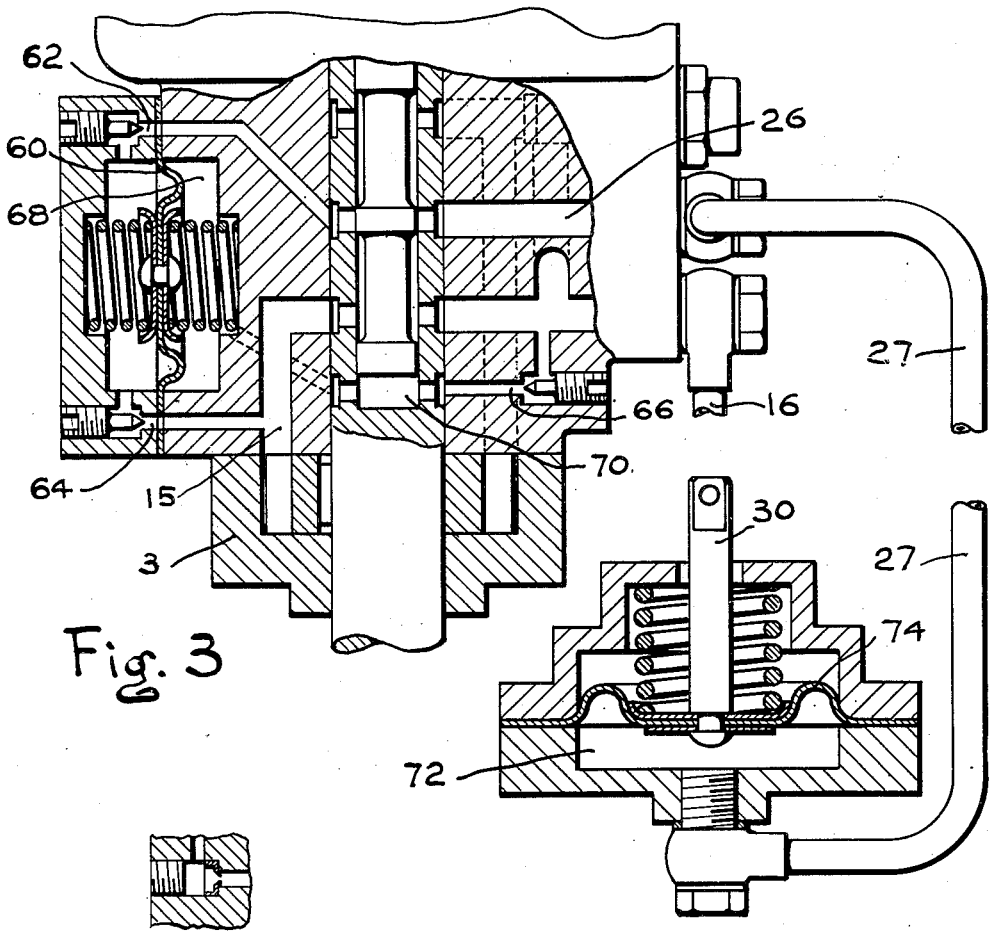
Fig. 3
Fig. 4
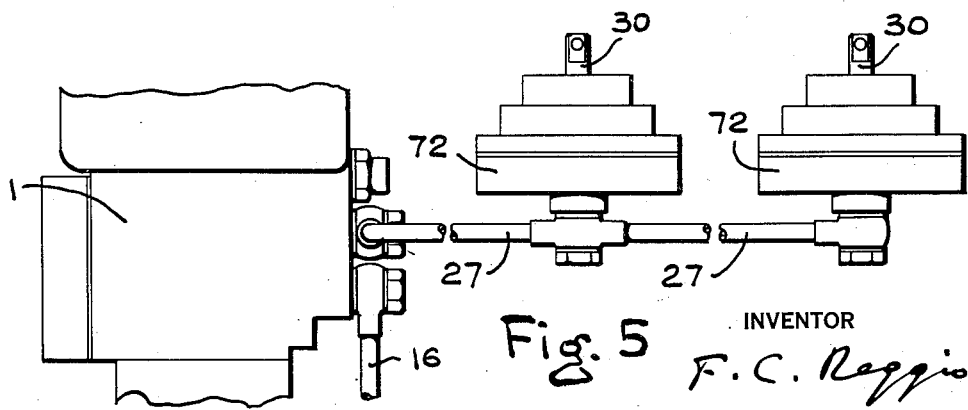
Fig. 5
INVENTOR
F. C. Reggio Dec. 12, 1944. F. C. REGGIO 2,364,817
REGULATING DEVICE
Filed Jan. 27, 1941 4 Sheets-Sheet 4

INVENTOR
F. C. Reggio

Patented Dec. 12, 1944

2,364,817

UNITED STATES PATENT OFFICE 2,364,817

REGULATING DEVICE

Ferdinando Carlo Reggio, Buffalo, N. Y.

Application January 27, 1941, Serial No. 376,170

19 Claims. (Cl. 123—140)

This invention relates to governors and other regulating devices, and is particularly useful for the automatic regulation and control of power plants.

Hydraulic governors are well known in which flyballs of comparatively small size are utilized merely to indicate speed and transmit the speed indication to a small pilot valve controlling the flow of oil under pressure which actuates a power piston used for operating the fuel feed control of the engine. In this way a very accurate speed regulation is made possible, and various adjustments can be made, such as the adjustment of the static fluctuation, or percentage of speed difference between no load and full load. However, governors of this type, in which the static fluctuation may be adjusted and assume positive as well as zero and negative values, include a considerable number of working parts and mechanical connections between the pilot valve and the power piston, and are rather delicate, cumbersome and expensive mechanisms.

One object of the present invention is to provide a simple and compact construction and arrangement of hydraulic governor having the above mentioned adjustments.

In accordance with the present invention a pressure-actuated power unit may be provided, connected with the engine throttle or other engine-controlling device, and including a piston or diaphragm urged by the pressure of a liquid medium, usually lubricating oil or other suitable liquid such for example as fuel oil, acting against the load of a spring. The adjustment of said piston or diaphragm, and in turn the engine fuel supply, are thus dependent on the oil pressure. The pilot valve included in the engine-driven pressure regulating unit controls the admission of oil under pressure to the power unit. The adjustment of the valve is dependent on the loads transmitted thereto by resilient means and by speed-responsive means. Furthermore, in order to render the operation of the governor stable, and the static speed fluctuation controllable, the adjustment of the pilot valve is also made dependent on the load exerted thereon by a liquid medium the pressure of which is caused to vary temporarily upon changes of the adjustment of the power unit.

Another object of the invention is to provide a simple, compact and accurate isochronous governor.

A further object is to provide automatic regulating devices or control mechanisms having simple and effective anti-hunting means.

Still another object is to provide, in combination with a servomotor and servomotor control means, anti-hunting means therefor.

A still further object is to provide a regulating device having a servomotor controlled by a pilot valve or other equivalent control means, and a fluid pressure chamber at one end of said valve, together with means whereby the fluid pressure in said chamber temporarily varies upon initiation of the motion of the servomotor to restrain the movement of the valve, prevent overtravel of said valve, and restore it to normal or neutral position. Still another object is to provide means whereby in said chamber a permanent as well as a temporary compensating variation of pressure occur upon a change of adjustment of the servomotor.

The above and other objects and advantages of the invention will become apparent from the following description taken in connection with the accompanying drawings, in which:

Figures 2, 3 and 4 are fragmentary sections showing partial modifications of the governor of Fig. 1;

Figure 5 is a front view of a governor as shown in Fig. 3 but including two pressure-actuated power units;

Figure 1:
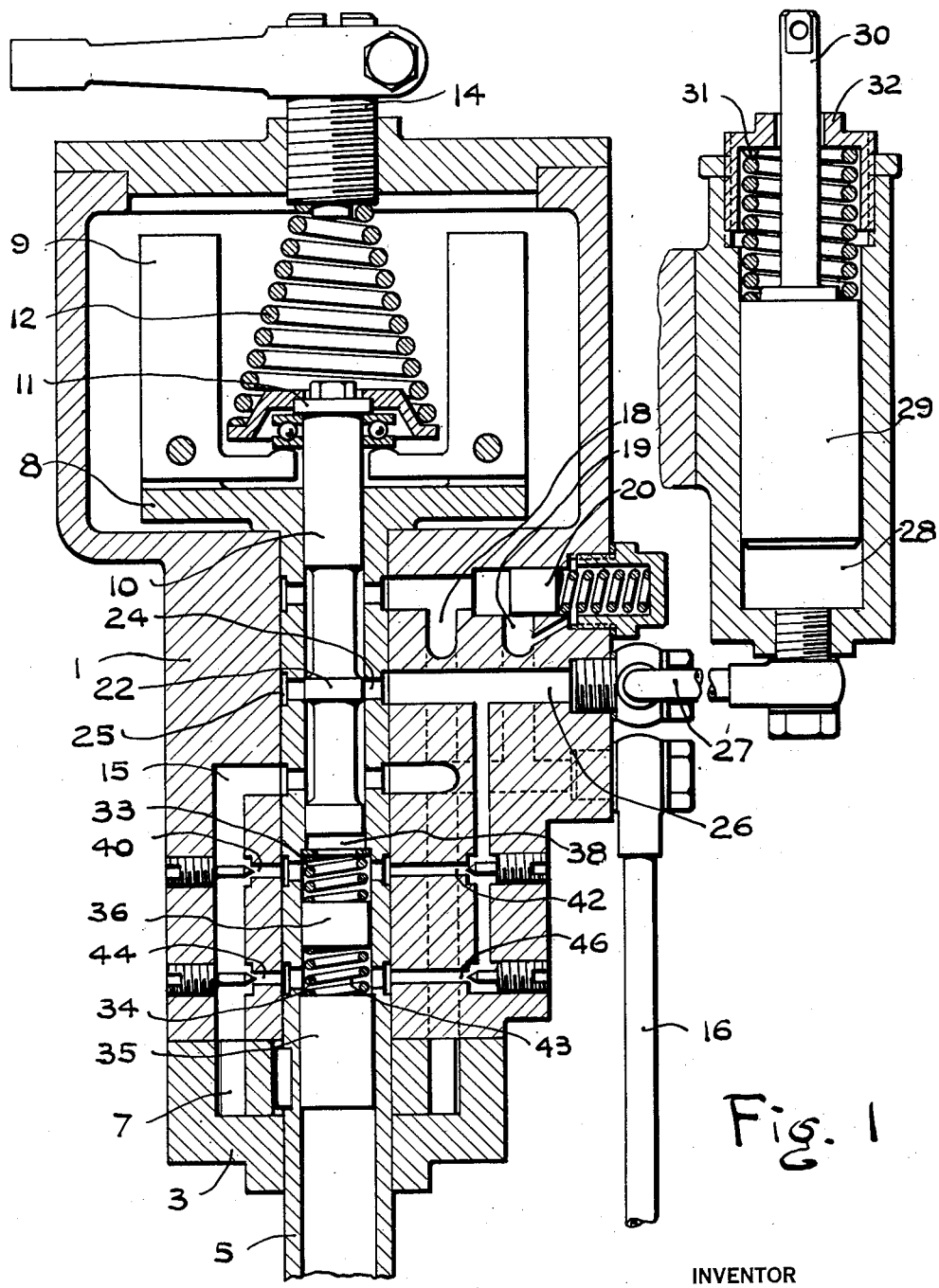
Figure 1 is a vertical section through a governor made in accordance with the present invention.

The governor body 1 is mounted on a base 3 supported on the engine. A shaft 5 driven from the engine, preferably through a resilient coupling, not shown, is keyed to the drive gear 7 of a gear pump, the companion gear of which is not shown in the drawings, extends through a bore formed in body 1 and terminates at its upper end with the yoke 8 carrying the flyballs 9. A pilot valve 10, slidably and rotatably mounted in an axial central bore formed in shaft 5, has at its upper end a collar 11 against which a thrust bearing, engaged by the flyballs 9, is seated. A speeder spring 12 urges the pilot valve 10 downwardly with a load which may be adjusted by means of a speed control member 14 having a threaded connection with the cover of the flyball compartment of the governor. In operation the spring 12 prevents the pilot valve 10 from being carried along in rotation by shaft 5.

The pump 7 draws oil at substantially atmospheric pressure, or other substantially constant pressure, through duct 15 connected with conduit 16 communicating with an oil source, not shown, for example the engine sump or a separate oil tank or reservoir, and discharges it into duct 18. Between discharge and inlet ports of pump 7 there is provided a by-pass 19 controlled by a spring-loaded plunger 20, through which by-pass oil flows continuously, maintaining the pressure in duct 18 at a substantially constant value. Ducts 15 and 18 communicate with annular grooves formed in valve 10 on both sides of the cylindrical enlargement 22 thereof which is normally in centered relation with the ports 24 in shaft 5 connected through an annular groove 25, duct 26 and pipe 27 with the cylinder 28 in which the power piston 29, connected through rod 30 with the throttle of the engine, is adapted to be actuated by the pressure of the oil acting against the load of a spring 31 or other suitable resilient means. An adjustable cap 32 provided with a lock nut permits the regulation of the load of spring 31.

At the lower end of pilot valve 10 the axial bore in shaft 5 is enlarged to provide a shoulder for a washer and a spring 33, while a similar spring 34 is seated against a plug 35 tightly mounted in shaft 5. An axially slidable plunger 36 is inserted between the two springs, thus defining two chambers, the upper one 38 communicating with ducts 15 and 26 through the orifices 40 and 42, and the lower one connected with the same ducts by means of orifices 44 and 46 respectively.

A downward displacement of valve 10 admitting oil under pressure from line 18 through the ports 24 to the cylinder 28 causes a displacement of the power piston 29 against the load of spring 31 and determines an increase of both the load of the latter and the oil pressure in cylinder 28. In the preferred embodiment of the invention such displacement of power piston 29 operates the engine throttle or other engine control mechanism in the direction to increase the engine speed.

When the engine is operating under steady load the enlarged portion 22 of the pilot valve 10 is in centered relation with the ports 24, the power piston 29 is stationary, and the oil pressure in cylinder 28 is balanced by the load of spring 31, and possibly also by that of additional resilient means, not shown, which may be connected with the engine throttle. The oil pressure in chambers 38 and 43 has values comprised between the pressures in ducts 26 and 15, depending on the relative open areas of orifices 40 and 42 for the former chamber, and 44 and 46 for the latter. Assuming for example the effective oil pressure in duct 15 to be equal to the atmospheric pressure, that is zero, the pressure $p$ in chamber 38 is $$p = p_1 \frac{1}{1 + \left(\frac{a_2}{a_1}\right)^2}$$

where $p_1$ is the effective pressure in line 26 and $a_2$ and $a_1$ are the effective areas of orifices 40 and 42 respectively. Thus the ratio between the pressures in chamber 38 and in line 26 may be varied between one and zero by properly adjusting the ratio of the open areas of the orifices 40 and 42. The pressure in chamber 43 in relation to the pressure in line 26 is likewise determined by the ratio of the effective areas of orifices 44 and 46. The pilot valve 10 is in balance under the loads transmitted thereto by the spring 12, the flyballs 9 and the oil pressure in chamber 38; and the plunger 36 is also stationary in a position such that the loads transmitted thereto by springs 33 and 34 balance the difference of oil pressure in chambers 38 and 43, said pressure being usually lower in the former than in the latter chamber.

Let us now assume that part of the load is dropped from the engine. The latter accordingly speeds up and the flyballs 9 move outwardly a distance which is a function of the speed change, thus determining an upward displacement of pilot valve 10, allowing a discharge of oil from the cylinder 28 to the duct 15. The power piston 29 moves downward under the action of spring 31 and operates the engine throttle or other engine control mechanism in the direction to reduce the engine speed. Generally, the orifices 40 and 42 have such ratio that the pressure in chamber 38, as already stated, is lower than in chamber 43. Furthermore the total open area of said orifices is considerably smaller than that of orifices 44 and 46. Therefore, as the oil pressure in line 26 drops to a lower value, the pressure in chamber 43 and, to a smaller extent, the pressure in chamber 38 also assume lower values. Plunger 36 moves downwardly toward a new position of equilibrium; its displacement however, which is several times larger than the displacement of pilot valve 10, is made slow by the fact that oil admitted to chamber 38 must flow through the small orifices. Thus the pressure therein becomes temporarily lower than the value corresponding to the ratio of orifices 40 and 42. The latter value is gradually attained as the plunger 36 reaches its new position of equilibrium.

The effect on the pilot valve 10 of this temporary pressure drop in chamber 38 is that the upwardly directed load applied by the oil pressure to the lower end thereof is reduced, and in order to maintain the pilot valve in equilibrium a corresponding increase in the upward load transmitted thereto by the centrifugal force is necessary. Therefore the governor, immediately after the reduction of engine load, tends to temporarily maintain the engine speed at a higher value. This is in accordance with the well known fact that any governor, in order to be stable, must regulate the speed so that an increase or a decrease of engine load determines, at least temporarily, a decrease or increase of engine speed, respectively. As the plunger 36 attains its new position of equilibrium, and the pressure in chamber 38 reaches the value corresponding to the ratio of orifices 40 and 42, the engine speed also attains the static value corresponding to the new engine load according to the static speed fluctuation determined by the adjustment of said orifices. Thus, at the end of the cycle, the pilot valve 10 is in the same position as before, while the power piston 29 and the plunger 36 are in a lower position, and the oil pressure in chamber 38 has a lower value.

The cycle of operation for an increase of engine load is simply the reverse of what has just been described. The engine slows down, the flyballs 9 move inwardly and cause a downward movement of pilot valve 10 which admits oil under pressure to cylinder 28 thus raising the power piston 29 against the load of spring 31 and opening the engine throttle. The oil pressure increases in line 26, in chamber 43 and, to a smaller extent, in chamber 38, causing an upward displacement of plunger 36 and a temporary further pressure increase in chamber 38. As the engine resumes speed, the increased centrifugal force and the increased pressure in the latter chamber tend to bring the pilot valve 10 back to its neutral position. As the pressure in chamber 38 is now temporarily higher, the centrifugal force reestablishing the balance of the pilot valve 10 in its neutral position is correspondingly smaller, and the governor maintains the engine speed temporarily at a lower value. As plunger 36 slowly approaches its new position of equilibrium, the oil pressure in chamber 38 and the engine speed gradually attain their static values corresponding to the higher engine load in accordance with the ratio of orifices 40 and 42.

It is therefore clear that the temporary speed fluctuation, that is the temporary variation of engine speed under which the pilot valve 10 is in equilibrium in its neutral position owing to the pressure variations in chamber 38 while plunger 36 is in motion, and which cause the engine speed to be stable even for zero or negative value of the static fluctuation, may be varied by adjusting the ratio of orifices 44 and 46, and has its maximum value when the latter is open and the former is completely closed.

The ratio between the open areas of orifices 46 and 44 may be reduced, thus determining a corresponding reduction of the temporary speed fluctuation, up to a certain limit, beyond which the engine becomes unstable. The static speed fluctuation, or permanent speed change between no load and full load, may however assume any desired positive value, usually lower than the temporary fluctuation, by properly adjusting the ratio of orifices 40 and 42. A small positive value of such fluctuation is necessary, for example, for parallel operation of synchronous generators in order to properly distribute the work among the several units. When the orifice 40 is open and orifice 42 is completely closed the static speed fluctuation is zero, and isochronous regulation is obtained with stability during the process of regulation.

The time required by plunger 36 to attain a new position of equilibrium after a change of engine load may be varied by changing the total open area of orifices 40 and 42. This can be done, obviously, without altering their ratio by proportionally increasing or decreasing both orifices.

Figure 2:
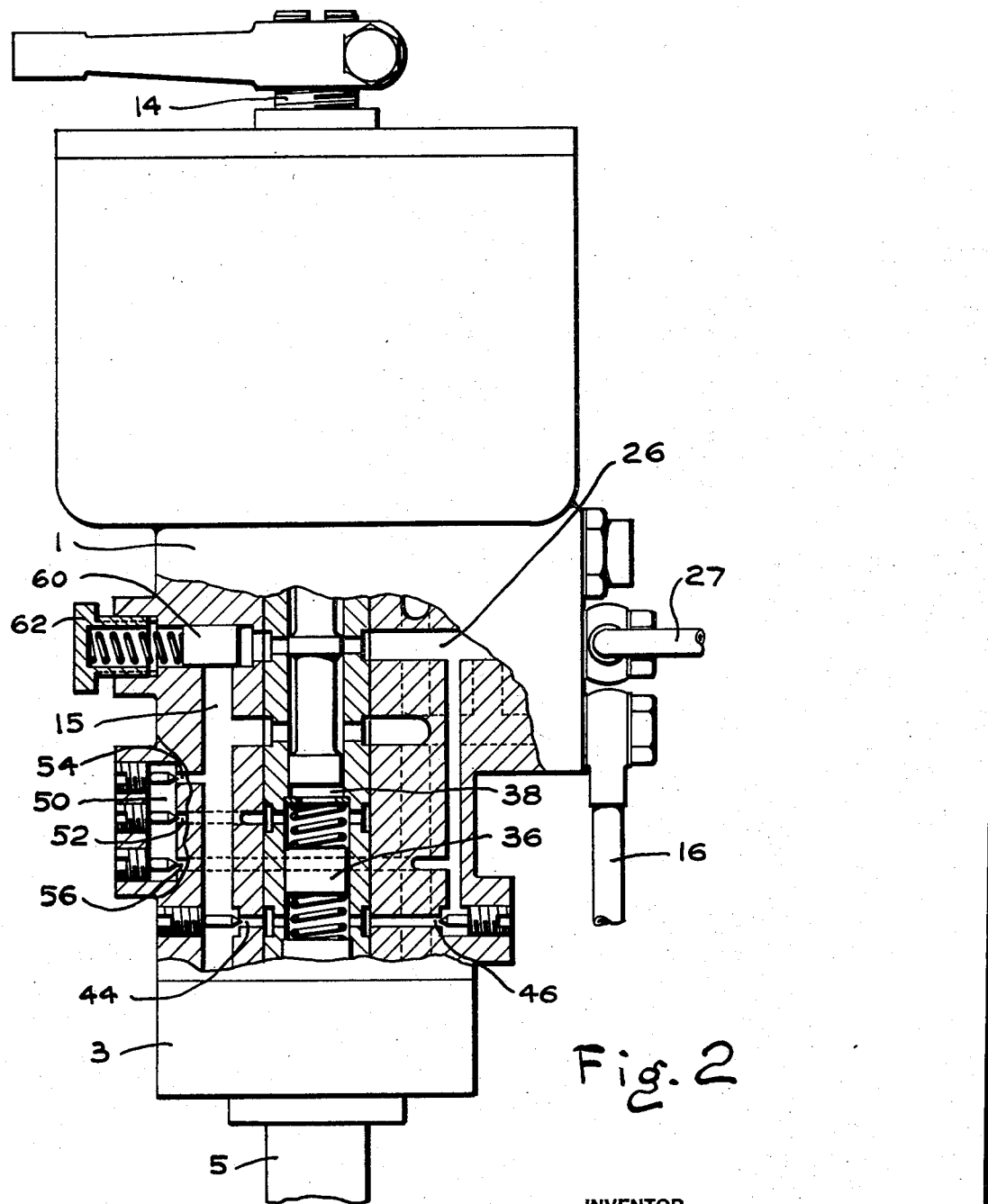

A more simple adjustment can be obtained with the arrangement of Fig. 2, in which chamber 38 is connected with chamber 50 by means of a small orifice 52, and chamber 50 communicates with ducts 15 and 26 through orifices 54 and 56 having a total open area considerably greater than orifice 52. Variations of the velocity of displacement of plunger 36 or changes of the static fluctuation are thus independently obtained by adjusting the orifice 52 or one of the orifices 54 and 56 respectively.

In Fig. 2 there is also shown a plunger valve 60 controlling a by-pass connecting ducts 26 and 15 and provided with a spring the load of which is dependent on the adjustment of a threaded cap 62. Reduction of the spring load determines a corresponding reduction of the maximum pressure in the power cylinder 28 and of the maximum engine load. The same device may be used to stop the engine.

Referring again to Fig. 1; in a governor designed for isochronous operation or zero static fluctuation the orifice 42 becomes unnecessary and may be eliminated, the chamber 38 communicating only with the constant pressure duct 15 by means of orifice 40. An isochronous governor along these lines is shown in Fig. 3, in which a resiliently loaded diaphragm 60 is substituted for the slidable plunger 36 of Fig. 1, and where the temporary speed fluctuation may be adjusted by varying the ratio of orifices 62 and 64, and the time required for the oil pressure in chambers 68 and 70 to return to the same value as in duct 15 after a change of engine load is determined by the adjustment of orifice 66. In the power cylinder 72 a spring-loaded diaphragm 74 is also substituted for the piston of Fig. 1. The operation of this governor is otherwise similar to that already disclosed in detail in connection with Fig. 1 and it is therefore considered unnecessary to again describe it in detail.

The slidable plunger 36 shown in Figs. 1 and 2, and the diaphragm 60 of Fig. 3 have a larger diameter and a longer stroke than the pilot valve 10. Referring in particular to Fig. 3, it is apparent that the orifice 66 dampens the motion of both the diaphragm 60 and the pilot valve. However it will be appreciated that when the pilot valve or the diaphragm is moving at a given velocity, the corresponding velocity of the fluid displaced and forced through orifice 66 is proportional to the square of the diameter of said valve or diaphragm, and the change of pressure in chamber 70, opposing said movement thereof, is proportional to the fourth power of said diameter. Assuming, for instance, that diaphragm 60 have an effective diameter four times as large as that of pilot valve 10, when diaphragm 60 is moving at a certain velocity it determines a relative pressure in chamber 70 which is 256 times as large as that occurring when pilot valve 10 is moving at the same velocity. It therefore will be readily understood that diameter and stroke of diaphragm 60 may be so designed in relation to the pilot valve that orifice 66, suitably adjusted to properly dampen the movements of the diaphragm, will not offer any appreciable resistance to the free motions of pilot valve 10. The danger that chamber 70 may operate as an objectionable dashpot for the pilot valve and prevent rapid movement of the latter in response to rapid speed changes, thus resulting in serious overspeed or underspeed upon sudden and wide engine load variations, may therefore be entirely avoided.

The above obviously applies also to the forms of governor illustrated in the other figures of the drawings, in which the plunger 36 or the bellows 83, and the springs connected therewith, may be designed in such way that their displacement be considerably larger than that of the pilot valve.

An arrangement that may be advantageous in connection with engines having two or more carburetors, or injection engines having two or more fuel injection pumps mounted at a considerable distance from one another, is shown in Fig. 5 and consists of a pressure-regulating unit 1 mounted on the engine in a location providing convenient driving means and connected by a pressure line 27 with two or more power units 72 controlling the carburetors or fuel injection pumps by way of rods 30, thus eliminating the necessity of having long mechanical linkages therebetween. A similar arrangement may also be used in connection with two or more engines coupled together or interconnected in such a way that their speeds are at all times equal or proportional, a single pressure-regulating unit 1 being provided, driven at a speed proportional to that of said engines and connected by a pressure line 27 with the power units 72 controlling said engines. Proper distribution of load may thus be obtained without using mechanical connections between the controls of the various engines.

Figures 6, 7:
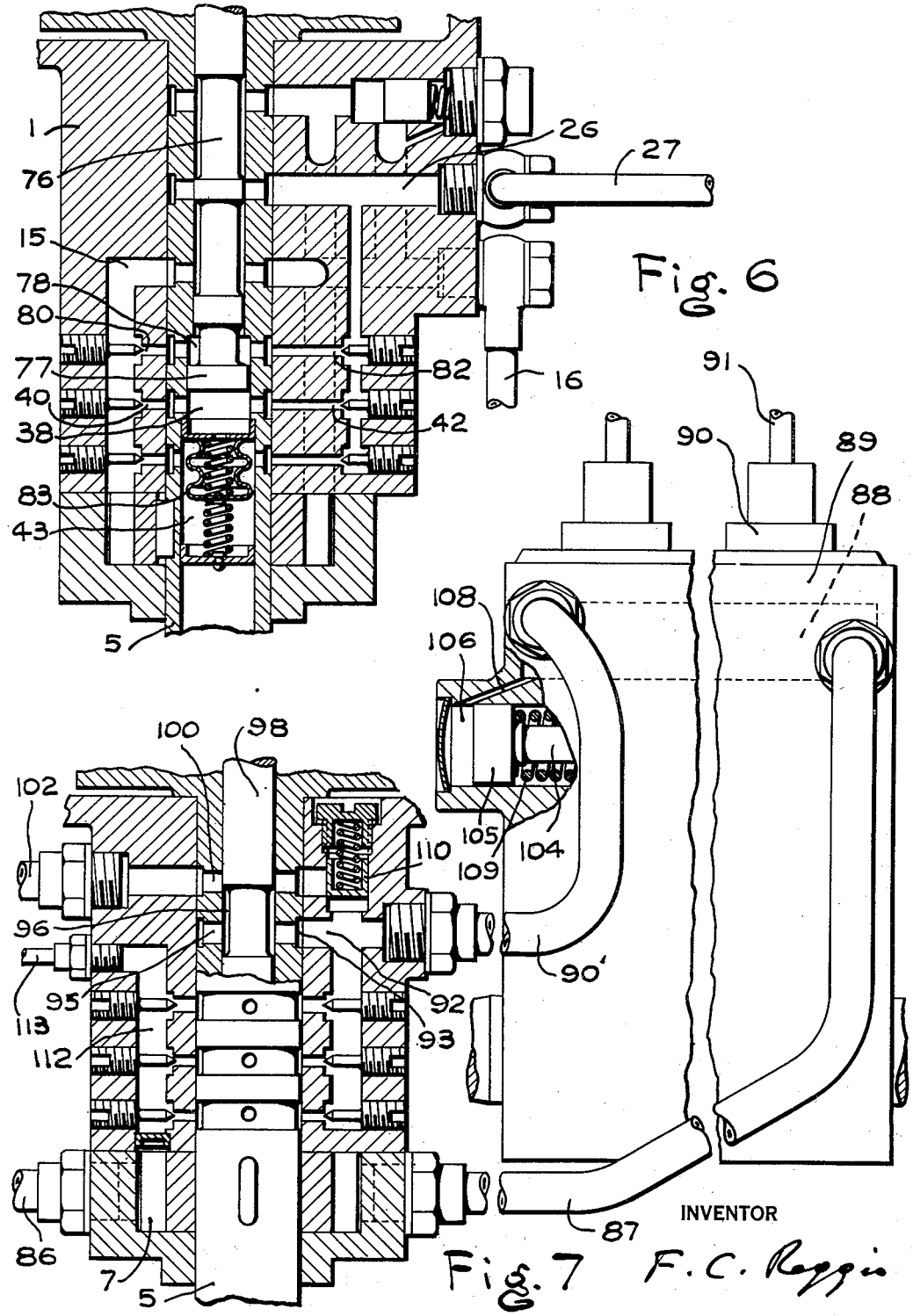
Figures 6 and 7 are fragmentary vertical sections showing further partial modifications of Fig. 1.

In some particular applications, such for example as the speed regulation of asynchronous generators, a negative static fluctuation is necessary or desirable. A governor as shown in Fig. 6 may then be used, in which a differential pilot valve 76 is provided having at its lower end a cylindrical expansion of larger diameter 77 adapted to slide in an enlarged bore formed in shaft 5, thus defining an annular chamber 78 communicating with ducts 15 and 26 by way of orifices 80 and 82 respectively. Upward or downward displacement of valve 76 causes the volume of chamber 78 to decrease or increase respectively. The governor is otherwise similar to that of Fig. 1 with the only exception that chambers 38 and 43 are separated by a bellows or diaphragm 83 instead of by a sliding plunger.

It will be readily understood that if orifice 82 is completely closed and orifice 80 sufficiently open so as not to interfere with the free flow of oil to and from chamber 78, the pressure therein remains constant, and the operation and possible adjustments of the governor are the same as already described in connection with Fig. 1. However if the four lower orifices are adjusted for zero static fluctuation, that is with the orifice 42 closed and orifice 40 set for suitable regulation of the displacement speed of bellows 83, and thereafter orifices 82 and 80 are both set open, upon an increase of engine load the pressure variation in chamber 43 and consequently in chamber 38 has at first a predominant action on plunger valve 76 thus determining the temporary speed fluctuation necessary for the stability of the governor, as has already been pointed out. Whereupon, as the bellows 83 approaches the new position of equilibrium and the oil pressure in chamber 38 gradually resumes the same value as in duct 15 and drops below the pressure in chamber 78, the latter pressure exerts on valve 76 a downward load which has increased proportionally to the pressure increase in line 26. A greater centrifugal force is thus required in order to reestablish the balance of the pilot valve 76 in its neutral position. Thus, disregarding the transitory period necessary for the process of stabilization occurring upon changes of engine load, the engine speed is higher at full load than at no load, and the speed difference therebetween depends on the ratio of orifices 82 and 80, and may be varied by altering the adjustment of either of said orifices.

Fig. 7 shows an arrangement of a governor particularly intended for injection engines and in which fuel oil is used as the liquid medium. Pump 7 draws fuel oil from the fuel source or other suitable tank or reservoir through line 86 and discharges said fuel by way of line 87 to the inlet reservoir 88 of an injection pump housing 89 including several injection pump elements 90 supplying fuel to the engine cylinders through high-pressure lines 91, and having their inlet ports in communication with reservoir 88. The delivery of pump 7 is considerably greater than the maximum engine consumption, and the excess fuel, after flowing through the reservoir 88 thus providing continuous cooling and scavenging thereof, returns to the fuel source or other suitable reservoir, not shown, by way of line 90', duct 92, annular groove 93 made in shaft 5, ports 95, annular groove 96 of plunger valve 98, ports 100 and line 102.

The effective area of ports 95 is determined by the axial adjustment of the plunger valve 98, and increases or decreases with an upward or downward displacement of the latter, respectively. This is the only restriction in the path of the excess fuel returning from the reservoir 88, the sections of all other lines, ducts and passages being sufficiently large so as not to cause any objectionable loss of pressure head therein. While the oil pressure in the previously described governors is determined by the load of the spring or springs connected with the power piston or power diaphragm, in the governor of Fig. 7 the pressure of the fuel oil discharged by pump 7 is dependent on the effective area of ports 95, as this area determines the speed at which the excess fuel oil is forced through this restricted section and therefore the pressure head corresponding thereto. However in all of these governors the operation of the pilot valve is the same in that an upward or downward displacement thereof causes a decrease or an increase of oil pressure, respectively.

Control of the engine fuel supply is obtained for example by providing at one end of the control rack 104 of the injection pump 89 a piston 105 slidable in a cylinder 106 communicating by way of a duct 108 with the reservoir 88. The fuel oil pressure thus actuates the control rack 104 against the load of a spring 109.

A spring-loaded valve 110 controlling a bypass connecting duct 92 with return line 102 is kept in closed position when the engine speed is being regulated by the governor, and automatically opens to maintain the maximum fuel oil pressure at a predetermined value when the pilot valve 98 is in its lowest position and ports 95 are closed, as it happens at full load and low engine speed.

Pressure chambers as previously described are provided at the lower end of the pilot valve and are connected by way of orifices with duct 92 and with duct 112, the latter being maintained at constant pressure, for example at substantially atmospheric pressure by means of a small line 113 communicating with the fuel tank and leading back thereto the small amount of oil flowing through the orifices. If the pressure in either line 86 or line 102 does not appreciably vary from a constant value, the duct 112 may be connected therewith, and line 113 may be eliminated.

It will be clearly understood that this governor operates in the same manner as those previously described in connection with Figures 1 to 6. If the engine load increases, the speed drops, the pilot valve 98 moves downwardly to reduce the opening of ports 100 thereby causing a pressure increase in cylinder 106 and a displacement of control rack 104 determining an increase of the engine fuel supply. The temporary speed fluctuation producing stability, and the various possible adjustments of static speed fluctuation are the same as already disclosed.

The main difference of operation between the governor of Fig. 7 and those previously described is that in the latter governors, as the engine is operating under steady load, the pilot valve is not in theoretically neutral position but is adjusted to maintain a very small open area of ports 24 through which a very small amount of oil under pressure is admitted to compensate for the flow of oil past the orifices and the possible leakage past the power piston, while in the former governor all the excess fuel, minus the amount flowing past the orifices and the possible leakage, flows through ports 100, and the open area thereof is therefore much larger and assumes different values for different engine loads and speeds.

Lines 87 and 90' are used both for supplying fuel to the injection pump and for operatively 3. An engine governor including pressure-actuated engine control means, a pressure regulating valve, a conduit for establishing a variable-pressure fluid connection between said valve and said control means, engine-driven speed-responsive means, resilient means, a variable volume chamber, operative connections whereby the adjustment of said valve is dependent on the load transmitted thereto by said speed responsive means, by said resilient means and by the pressure in said chamber, means whereby the volume of said chamber varies upon changes of pressure in said conduit, a constant pressure reservoir, and fluid flow communications including small apertures between said conduit, said chamber and said reservoir whereby the pressure in said chamber is dependent on the pressure in said conduit and temporarily varies upon variations of the pressure in said conduit owing to changes of volume of said chamber.

4. In an engine governor including resiliently loaded engine control means connected with fluid conduit means and actuated by the pressure in the latter, a slidable valve for controlling the fluid admission to and discharge from said conduit means, an engine driven flyball mechanism and resilient means acting against one another and connected with said valve for shifting the latter upon variations of engine speed, a constant pressure reservoir, a variable volume pressure chamber for applying pressure to one end of said valve, fluid flow communications including small apertures between said conduit means, said chamber and said reservoir, and means whereby the volume of said chamber varies upon changes of pressure in said conduit means, at least one of said small apertures being adjustable.

5. In a speed governor for a prime mover including resiliently loaded pressure actuated control means connected with a variable pressure fluid conduit, a slidable valve for controlling the pressure in said conduit, resilient means, speed responsive means driven from said prime mover and acting against said resilient means for shifting said valve, variable pressure chambers for applying oppositely directed variable pressure loads to said valve, one of said chambers having a variable volume which changes upon variations of pressure in said conduit, a constant pressure fluid source, and fluid flow communications including small adjustable apertures between said conduit, said chambers and said source.

6. In combination with a fuel injection pump for an internal combustion engine, a fuel reservoir in said pump, a fuel delivery control member connected with pressure responsive means whereby its adjustment is determined by the fuel pressure in said reservoir, a source of pressure fuel supply, a slidable valve for regulating the fuel pressure in said reservoir, a resilient means and engine driven speed responsive means acting against one another and operatively connected with said valve, a constant pressure fuel source, a variable volume pressure chamber for applying a pressure load to one end of said valve, the volume of said chamber being dependent on the fuel pressure in said reservoir, and a fuel flow communication including a small aperture between said chamber and said constant pressure source.

7. In an engine governor including resiliently loaded pressure actuated engine control means, a slidable pressure regulating valve, first conduit means for a variable pressure fluid connection between said valve and said control means, a first chamber, engine driven speed responsive means, resilient means, operative connections whereby the adjustment of said valve is dependent upon the loads transmitted thereto by said speed responsive means, by said resilient means and by the fluid pressure in said first chamber, a second chamber, resiliently loaded movable wall means for separating said first and second chambers, second conduit means at substantially constant pressure, and fluid flow communications including flow restricting means between said first chamber and said first and second conduit means and between said second chamber and said first and second conduit means.

8. In an engine governor including pressure actuated engine control means, first fluid conduit means connected with said control means, a slidable valve for controlling the fluid admission to and discharge from said first conduit means, engine driven speed responsive means, resilient means, a first chamber, operative connections whereby the adjustment of said valve is dependent upon the loads transmitted thereto by said speed responsive means, by said resilient means and by the pressure in said first chamber, a second chamber, a resiliently loaded movable wall between said chambers, second conduit means at substantially constant pressure, and fluid flow communications including flow restricting means between said first chamber and said second conduit means and between said second chamber and said first and second conduit means.

9. An engine governor including resiliently loaded engine control means actuated by the pressure of a fluid in conduit means whereby the pressure in the latter and the adjustment of said control means are interdependent, a slidable valve for controlling the fluid admission to and discharge from said conduit means, engine driven speed responsive means and adjustable resilient means operatively connected with said valve, a reservoir at substantially constant pressure, first and second chambers having a common movable resiliently loaded wall and each communicating by way of flow restricting means with said conduit means and reservoir, at least part of said flow restricting means being adjustable, and communication means whereby an operative load is applied to said valve by the pressure of the fluid in said first chamber.

10. An engine governor including resiliently loaded engine control means connected with fluid conduit means and actuated by the pressure in the latter, a valve for controlling the fluid admission to and discharge from said conduit means, engine driven speed responsive means and resilient means for actuating said valve, a constant pressure reservoir, a pressure chamber for applying an operative pressure load to said valve and defined in part by a spring loaded movable wall, fluid communication by way of adjustable flow restricting means between said chamber and said reservoir, and means for applying to said movable wall a fluid pressure dependent upon the pressure in said conduit means thereby determining variations of volume of said chamber and temporary modifications of pressure in said chamber upon changes in the adjustment of said control means.

11. A speed governor for prime mover including resiliently loaded control means connected with fluid conduit means and actuated by the pressure in the latter, slidable valve means for controlling the fluid admission to and discharge from said conduit means, engine driven flyball mechconnecting the governor pressure-regulating unit with the control mechanism of the pump. Obviously, when several separate fuel injection pumps are provided, they may be connected with their reservoirs 88 either in series with or in parallel between lines 87 and 90'.

It is to be understood that, while all the orifices referred to above are shown in the drawings as including an adjustable threaded needle having a tapered end, any other suitable type of orifice may be used. Non-adjustable orifices of the "thin-edge" type shown in Fig. 4, for example, or equivalent orifices characterized by the fact that the flow of oil therethrough under a given pressure head is not appreciably influenced by changes of oil viscosity, may be substituted for any or all of the governor orifices.

It will be appreciated that governors according to the present invention are comparatively simple, have a small number of operating parts, may be made rugged and compact, and can be easily adapted to engines of different design without requiring complicated, delicate and costly mechanical interconnections. Friction is also reduced to a very small value, thereby improving the accuracy and promptness of the speed regulation.

In the above disclosed examples of embodiment of the invention, a hydraulic operative connection is provided between the plunger 36 of Figs. 1 and 2, or the equivalent diaphragm 60 of Fig. 3 or bellows 83 of Fig. 6 on the one hand, and the fluid pressure actuated servomotor on the other hand, so as to cause displacement of said plunger 36 or equivalent diaphragm or bellows upon changes of adjustment of said servomotor. However it will be obvious to those skilled in the art that any other suitable operative connection, including either hydraulic, or pneumatic, or mechanical means such as linkage means or resilient connecting means, may be provided between said plunger, diaphragm or bellows and said servomotor, in substitution for the specific hydraulic operative connection herein disclosed, to cause displacement of said plunger, diaphragm or bellows upon change of adjustment of the servomotor. It is further to be understood that said plunger, diaphragm or bellows may be actuated in response to changes of an operative condition other than the adjustment of the governor servomotor.

Furthermore, it will be clearly understood that the invention is not limited to a regulating device having a hydraulic servomotor, whether single-acting or double-acting, but it may include any other suitable type of servomotor, such for example as an electric, or pneumatic, or mechanical servomotor provided with control means; and that the fluid used for exerting a compensating or restraining variable pressure on the servomotor control means may either be an incompressible fluid such as lubricating oil or liquid fuel, or an elastic fluid such as air. And while the disclosed examples of embodiment of the invention are directed to speed regulating devices, it will be clearly understood that the invention may be used also in connection with control or regulating devices other than governors, in which devices the servomotor control member is connected with means responsive to one or more operative conditions other than speed.

These embodiments of the invention have been shown merely for purpose of illustration and not as a limitation of the scope of the invention. It is therefore to be expressly understood that the invention is not limited to the specific embodiments shown, but may be used in various other ways, and various modifications may be made to suit different requirements, and that other changes, substitutions, additions and omissions may be made in the construction, arrangement and manner of adjustment and operation within the limits or scope of the invention as defined in the following claims.

Where claims are directed to less than all of the elements of the complete system disclosed, they are intended to cover possible uses of the recited elements in installations which may lack the non-recited elements.

What I claim is:

1. A hydraulic governor including pressure-actuated engine control means, an axially slidable pressure regulating valve, a first conduit for establishing a variable-pressure fluid connection between said valve and said engine control means, an engine-driven flyball mechanism and resilient means acting against one another and connected with said valve for shifting the latter in response to speed changes, a first chamber at one end of said valve, the fluid pressure in said chamber exerting on said valve an axial load cooperating with the centrifugal force of said flyball mechanism to balance the load of said resilient means whereby changes of fluid pressure in said chamber cause corresponding changes of said centrifugal force and therefore of the speed necessary for reestablishing the axial equilibrium of said valve, a second chamber separated from said first chamber by means of a floating pressure-actuated resiliently-slidable plunger, a second conduit in which the fluid is maintained at constant pressure, first and second orifices for establishing a fluid flow communication between said second chamber and said first and second conduits respectively, the ratio of said orifices determining the temporary speed fluctuation, and third and fourth orifices connecting said first chamber with said first and second conduits respectively, the total area of said third and fourth orifices determining the duration of said temporary speed fluctuation, and the ratio of said third and fourth orifices determining the permanent speed fluctuation.

2. A hydraulic engine governor including pressure-actuated engine control means, an axially-slidable pressure regulating valve, a first conduit for establishing a variable-pressure fluid connection between said valve and said engine control means, engine-driven speed responsive means and resilient means operatively connected with said valve, a first variable-pressure fluid chamber at one end of said valve whereby the axial equilibrium of said valve is dependent on the loads transmitted thereto by said speed responsive means, by said resilient means and by the pressure in said chamber, a second chamber, a resiliently loaded floating diaphragm for separating said first and second chambers, a second conduit maintained at constant pressure, first and second orifices for connecting said second chamber with said first and second conduits respectively, and third and fourth orifices for connecting said first chamber with said first and second conduits respectively, the temporary speed fluctuation, the duration thereof, and the permanent speed fluctuation being dependent on the ratio of said first and second orifices, on the size of said third and fourth orifices, and on the ratio of the latter respectively.

anism and resilient means operatively connected with said valve means, a constant pressure reservoir, a pressure chamber for applying an operative pressure load to said valve means, resiliently loaded movable wall means for varying the volume of said chamber, means for applying to said wall means a pressure load varying proportionally to changes of pressure in said conduit means, means including at least one adjustable orifice for controlling the ratio of proportionality between the changes of pressure in said conduit means and the corresponding volume variations of said chamber, duct means connected with said conduit means and said reservoir by way of small apertures one at least of which is adjustable, and a fluid communication including adjustable flow restricting means between said chamber and said duct means.

12. A speed governor for prime mover including pressure actuated control means, a slidable valve for controlling the pressure of a fluid actuating said control means, speed responsive means and resilient means operatively connected with said valve, variable pressure chambers for applying oppositely directed variable pressure loads to said valve, one of said chambers having a variable volume which changes upon variations of pressure of said fluid actuating said control means, constant pressure duct means, and fluid flow communications including adjustable flow restricting means between said duct means, said chambers and said fluid actuating said control means.

13. In combination with a fuel injection pump for internal combustion engine, a fuel reservoir in said pump, a fuel delivery control member connected with spring loaded pressure responsive means whereby the engine fuel supply is dependent on the fuel pressure in said reservoir, means for supplying to said reservoir pressure fuel in excess of the maximum requirement of said engine, a slidable valve for controlling the effective area of outlet ports for the excess fuel to regulate the pressure in said reservoir, engine driven speed responsive means and resilient means operatively connected with said valve, duct means at substantially constant pressure, a variable volume pressure chamber for applying a variable axial pressure load to said valve, the volume of said chamber changing upon variations of pressure in said reservoir, and fuel flow communication means including adjustable flow restricting means between said chamber and said duct means.

14. A control system including a hydraulic servomotor, a bodily movable valve for controlling said servomotor, fluid containing means defined in part by said valve for exerting variable operative fluid pressure on said valve, fluid leakage means connected with said fluid containing means, and wall means which move with said servomotor to displace fluid through said leakage means and cause temporary pressure variation in said fluid containing means, the motion of said valve causing displacement of considerably less fluid than the motion of said wall means, whereby upon initial motion of said valve fluid flows at comparatively low velocity through said leakage means causing no material pressure variation in said fluid containing means and thereby exerting no appreciable delaying action on said valve, while upon initiation of the ensuing motion of said servomotor fluid is caused by said wall means to flow through said leakage means at relatively high velocity thus determining an effective change of pressure in said fluid containing means and the exertion of a restraining fluid pressure load on said valve to prevent overtravel thereof.

15. A regulating device including servomotor means, a member movable as one rigid body to control said servomotor means, variable pressure fluid containing means defined in part by said member to exert variable fluid pressure on said member in the direction of the motion thereof, fluid leakage means connected with said fluid containing means, and movable wall means to displace fluid through said leakage means and cause temporary pressure variations in said fluid containing means upon motion of said servomotor, the fluid displacement of said member being several times smaller than that of said wall means.

16. A regulating device including fluid pressure actuated servomotor means, a valve slidable as one rigid member to control said means, a fluid chamber defined in part by one end of said valve, and means including resiliently loaded movable wall means and fluid flow restricting means connected with said chamber for temporarily varying the pressure in said chamber upon motion of said servomotor means.

17. A speed regulating device having a hydraulic servomotor, a valve slidable as one rigid body to control said servomotor, flyball means connected with one end of said valve, a fluid chamber defined in part by the other end of said valve, fluid leakage means connected with said chamber, and fluid-displacing wall means for temporarily varying the pressure in said chamber upon change of adjustment of said servomotor, the fluid displacement of said valve being several times smaller than that of said wall means.

18. A speed control device having a fluid pressure actuated servomotor, a bodily slidable valve for controlling said servomotor, flyball means connected with one end of said valve, fluid containing means wherein the pressure is dependent upon the adjustment of said servomotor, a fluid chamber at the other end of said valve, fluid flow restricting means connecting said fluid containing means and chamber, and movable wall means displacing fluid through said flow restricting means and determining a temporary difference of pressure between said chamber and said fluid containing means upon changes of adjustment of said servomotor.

19. A speed regulating device including a servomotor, a slidable valve member for controlling said servomotor, flyball means connected with one end of said member, first fluid containing means defined in part by the other end of said member, second fluid containing means wherein the pressure is substantially atmospheric, fluid flow restricting means between said first and second containing means, movable wall means defining in part said first fluid containing means and having fluid-displacing area and stroke considerably larger than those of said member respectively, and means whereby said wall means move with said servomotor.

FERDINANDO C. REGGIO.